Aug. 6, 1940.   A. C. PERRY   2,210,775
ELECTRICAL SWITCH
Filed March 1, 1938   3 Sheets-Sheet 1

Albert C. Perry
INVENTOR.
BY Snow & Co.
ATTORNEYS.

Aug. 6, 1940. A. C. PERRY 2,210,775
ELECTRICAL SWITCH
Filed March 1, 1938 3 Sheets-Sheet 2
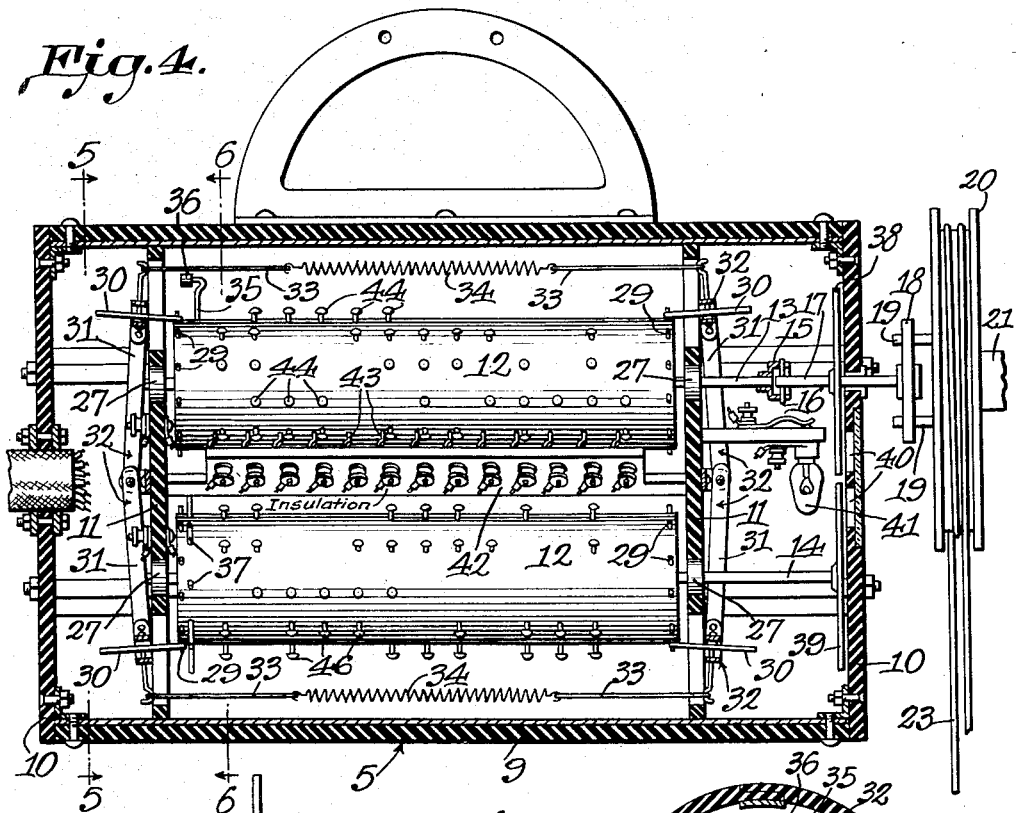
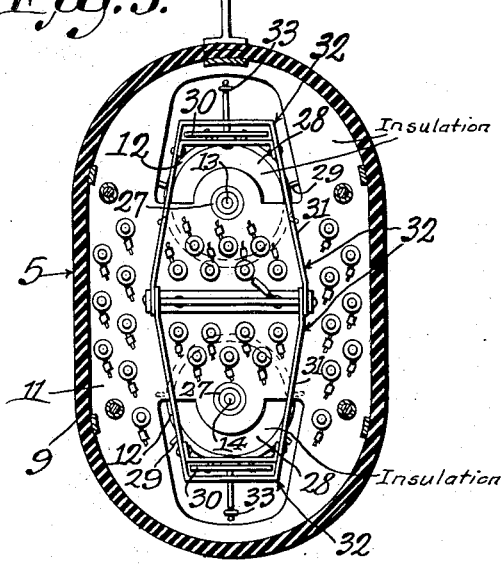
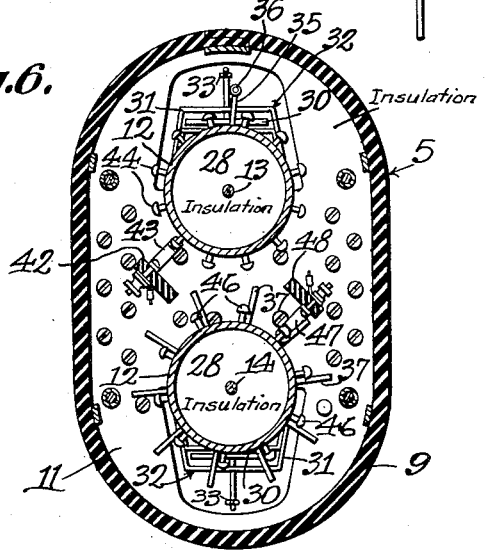
Albert C. Perry
INVENTOR.
BY CA Snow & Co.
ATTORNEYS.

Aug. 6, 1940.  A. C. PERRY  2,210,775
ELECTRICAL SWITCH
Filed March 1, 1938  3 Sheets-Sheet 3
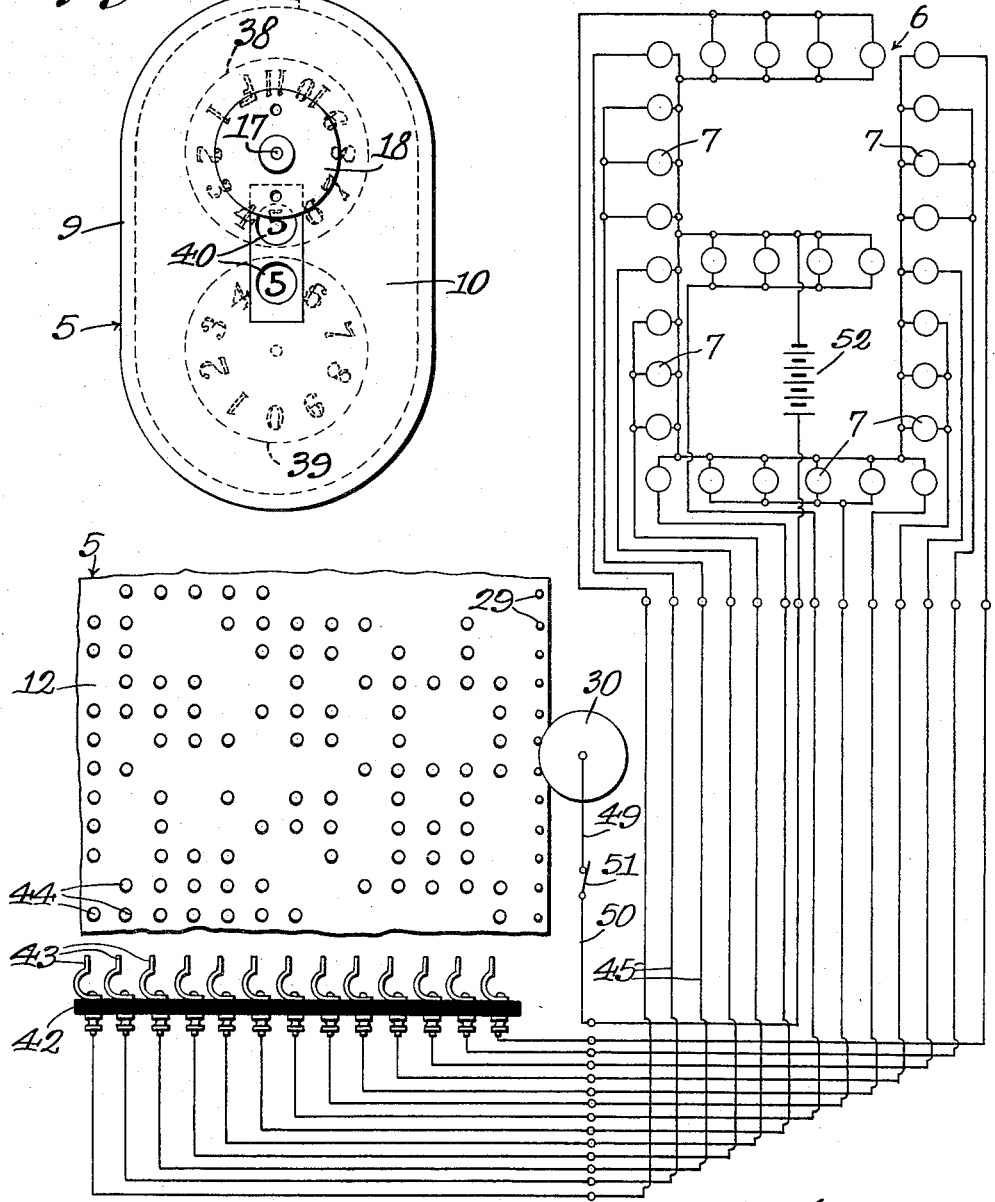
Albert C. Perry
INVENTOR.
BY *C. Snow & Co.*
ATTORNEYS.

Patented Aug. 6, 1940

2,210,775

UNITED STATES PATENT OFFICE 2,210,775

ELECTRICAL SWITCH

Albert C. Perry, Toledo, Ohio

Application March 1, 1938, Serial No. 193,369

2 Claims. (Cl. 200—6)

This invention relates to a device designed for indicating depth, and the draft of ships, equipped with the indicator.

An important object of the invention is to provide a portable device of this character which may be readily and easily mounted on the ship's railing or other convenient location, whereby the officer in charge of the loading of the vessel, may readily observe the indicator to determine the variance of draft of the vessel, during the loading thereof.

Another object of the invention is to provide a device of this character which may be brought into operation as a means for making soundings to determine the depth of water, through which the vessel is moving.

A still further object of the invention is to provide an indicator which is electrically controlled, to the end that the indicator is exceptionally sensitive and accurate in operation.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 4 is a longitudinal sectional view through the switch housing illustrating the cylindrical switch members of the device.

Figure 5 is a sectional view taken on line 5—5 of Figure 4.

Figure 6 is a sectional view taken on line 6—6 of Figure 4.

Figure 7 is an end elevational view of the switch housing.

Figure 8 is a diagram illustrating the circuits to the various electric lamps of the indicator.

Figure 1:
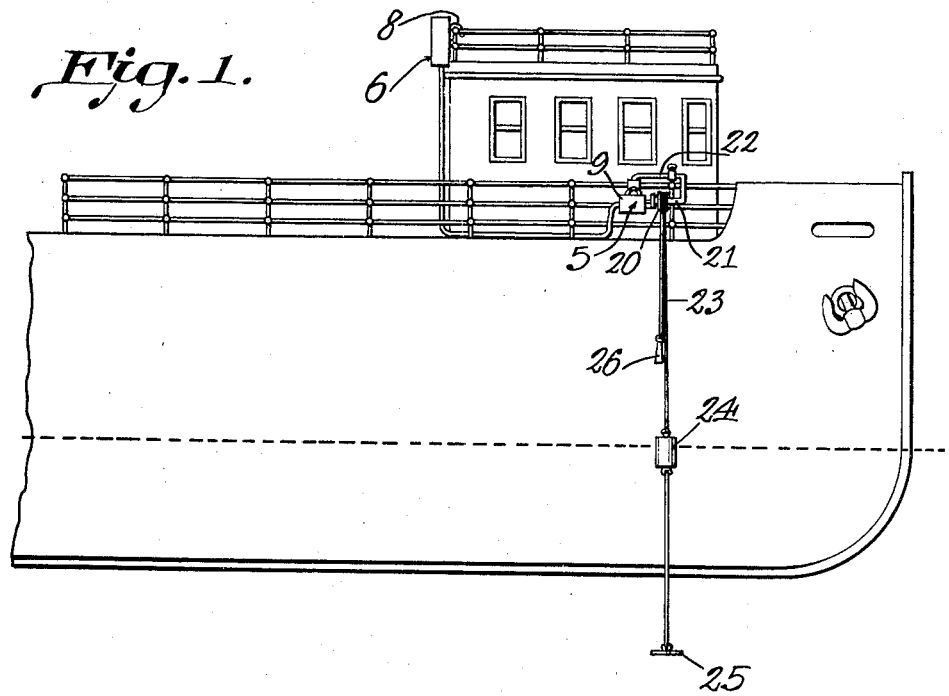
Figure 1 is an elevational view illustrating the indicator as positioned on a ship's railing.
Figure 2:
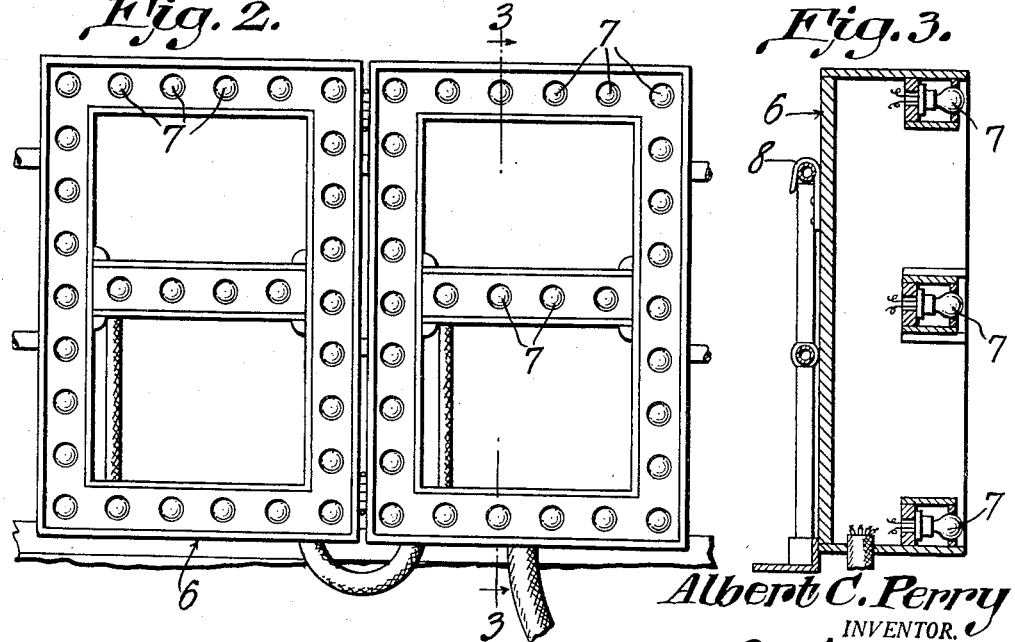
Figure 2 is an elevational view of the indicator or display section of the device.
Figure 3:
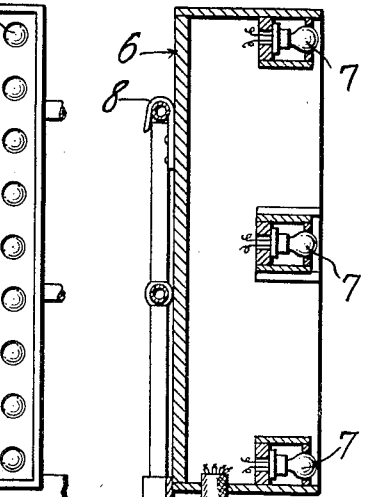
Figure 3 is a vertical sectional view taken on line 3—3 of Figure 2.

Referring to the drawings in detail, the indicator embodies a switch member indicated generally by the reference character 5, and an indicator 6, the indicator embodying a sectional housing, the sections being hingedly connected, so that when they are moved to their closed positions, a box-like container is provided for containing the various elements of the device.

As shown, each of the sections of the indicator housing, is provided with electric lamps 7 which are arranged in such a way that predetermined figures and letters may be formed by illuminating certain of the electric lamps.

Hooks 8 are provided on the rear wall of the indicator housing, and are so constructed, that the indicator housing may be readily and easily hung over a ship's railing, where it will be in full view of the officer in charge of loading the vessel. In the present showing, the indicator housing has been hung over the railing of the pilot house of the ship, and in use it is contemplated to use two of these indicating devices, one to be positioned on each cabin or deck house of the ship. It will of course be understood that the usual freight ship is provided with two of these deck houses, one at each end.

The switch housing forming an important part of the invention, is constructed of insulating material, and is indicated by the reference character 9, the ends of the switch housing being closed by means of the removable closures 10. Mounted within the switch housing 9, and disposed in spaced relation with the removable closures 10, are partitioning members 11, which are also constructed of suitable insulating material. Mounted within the switch housing, are cylindrical switch members 12 arranged in parallel spaced relation with each other, the cylindrical switch members being mounted on the shafts 13 and 14 respectively, the shaft 13 being provided with a clutch member 15 at one end thereof, with which the clutch member 16 of the shaft 17 cooperates in clutching the shafts 13 and 17 together. The shaft 17 extends through one of the end closures of the housing 9, where it is provided with a disk 18 formed with openings to receive the pins 19 extending from the pulley 20. The pulley 20 is mounted on the shaft 21 that is supported by the arm 22 forming a part of the bracket which supports the switch housing 9.

Operating over the pulley 20, is a cable 23 that carries the float 24, and at a distance below the float 24 less than the depth of water at the point of operation, is attached a disk-like weight 25 designed to partly submerge the float 24, and hold the float steady in rough water.

At the opposite end of the cable 23, is a hanging weight 26 acting as a counterbalance, to hold the cable taut and at the same time insure the operation of the pulley 20, as the ship or vessel moves vertically.

The shafts 13 and 14 operate in bearings 27 mounted in openings in the partitioning members 11. These shafts 13 and 14 are secured to the disks 28 that close the ends of the cylindrical switch members 12. These disks 28 are constructed of insulating material, so that the shafts 13 and 14 are insulated against electric current passing through the cylindrical switch members 12. Spaced pins 29 extend laterally from the cylindrical switch members 12, and are engaged by the disks 30 that operate in horizontal planes, the disks 30 acting to restrict movement of the cylindrical switch members, under normal conditions.

The disks 30 are mounted adjacent to the outer ends of the pivoted sections 31 of the frames 32 which are arranged adjacent to the ends of the cylindrical switch members 12, the pivoted sections of the frames at opposite ends of the cylindrical switch members 12, being connected by means of the rods 33 and coiled spring members 34, to the end that the pivoted sections of the frames 32 at the ends of the members 12, are normally urged towards each other moving the disks 30 into close engagement with the spaced pins 29. Thus it will be seen that due to this construction, when the cylindrical switch members 12 rotate, the engagement of the spaced pins 29 with the disks 30, will cause the disks 30 to move outwardly against the action of the coiled springs 34. After the pins contacting with the disks 30, pass the disks 30, the disks 30 will of course move into contact with the adjacent pins holding the cylindrical switch members 12 against movement, under normal conditions. Extending laterally from the uppermost cylindrical switch members 12, is an arm 35 provided with a roller 36 at its end, the roller being designed to contact with the spaced pins 37 that extend laterally from the adjacent lower cylindrical switch member 12. Due to this construction, it will be obvious that with each complete rotation of the uppermost cylindrical switch member 12, the roller 36 will contact with one of the pins 37, moving the lower cylindrical switch member 12 one point.

Mounted on the shaft 17, is a disk 38 supplied with numbers from 1 to 12, the numbers corresponding to the number of pins 29, extending from the uppermost cylindrical switch member 12. This cylindrical switch member is constructed in such a way that with each movement of the upper cylindrical switch member 12, the distance between two adjacent pins, will indicate a variance of one inch in the length of the cable 23. Mounted on the shaft 14 is a disk 39, the disk 39 being provided with numbers from 1 to 10, corresponding to the pins extending laterally from the ends of the lower cylindrical switch member 12. The distance between adjacent pins of the lowermost cylindrical switch member 12, indicates variance in feet, in the length of the cable 23.

Sight openings 40 are provided in one of the end closures 10 of the switch housing, and afford means whereby the numbers appearing on the disks 38 and 39, may be viewed to determine the length of the cable extending into the water, which of course controls the movements of the cylindrical switch members to determine the draft or depth of the water.

An electric lamp indicated by the reference character 41, is disposed adjacent to the sight openings 40, and is arranged to illuminate the numbers appearing on the disks 38 and 39, so that they may be read in the dark.

Mounted within the switch housing 9, and disposed longitudinally thereof, is a bar 42 constructed of insulating material, the bar 42 providing a support for the contacts 43 that are so arranged that they will contact with the pins 44 extending from the uppermost cylindrical switch member 12. These contact members 43 are in circuit with the lamps of the indicator, indicated by the reference character 7, through the wires 45. In connection with this construction, it might be stated that these pins 44 are so arranged that when the cylinder 12 supporting the pins 44, is moved to predetermined positions, certain groups of the lamps 7 of the indicator, will be illuminated to form numbers and letters, corresponding to the numbers appearing through the sight openings 40, indicating the draft of the ship, or depth of the water. The pins 46 which extend from the lowermost cylindrical switch member 12, are arranged to be engaged by the contact members 47 carried by the bar 48 arranged within the switch housing, the contact members 47 being in circuit with the lamps 7 of the adjacent section of the indicator housing, through certain of the wires 45. When the uppermost cylindrical switch member 12 has made one complete revolution, and the lowermost cylindrical switch member 12 has been moved one space, the indicator will be illuminated to designate in feet and inches, the amount of draft of the ship, or depth of the water.

It will of course be understood that certain of the wires 45 connect with the contact members 47, so that when the pins 46 engage the contact members 47, a circuit will be completed.

The return circuit of the wiring system, is made through the disks 30, wires 49 and 50, switch member 51, and battery 52.

As the ship or vessel supplied with the indicating device raises or lowers, owing to a variation in the weight of the load of the vessel, it is obvious that the cable 23 will move over the pulley 20, rotating the pulley 20, which in turn rotates the cylindrical switch members, completing the circuit to illuminate the lamps of the indicator, to the end that the draft of the vessel or depth of the water, may be readily determined.

I claim:

1. A switch for use with electric indicators, comprising a housing, partitioning members within the housing and spaced from the ends of the housing providing compartments, shafts extending through the housing, cylindrical members mounted on the shafts, contact pins extending from the surfaces of the cylindrical members and arranged in distinctive groups, stationary contacts supported within the housing and disposed in the paths of travel of said contact pins to complete circuits with the contact pins as said contact pins and stationary contacts engage, rows of pins extending from the peripheries of the cylindrical members at the ends thereof, disks mounted within the compartment and engaging the rows of pins at the ends of the cylinders restricting rotary movement of the cylindrical members, and yieldable members on which said disks are supported.

2. A switch for use with electric indicators, comprising a housing, shafts extending through the housing in parallel spaced relation with respect to each other, cylindrical members mounted on the shafts, contact pins extending from the surfaces of the cylindrical members, stationary contacts supported within the housing and disposed in the patch of travel of the contact pins of the cylindrical members, said contact pins adapted to engage the stationary contacts completing circuits, pivoted frames mounted within the housing, disks mounted on the frames and operating at right angles to the direction of operation of the cylindrical members, pins arranged in rows and extending from the cylindrical members adjacent to the ends thereof, said pins engaging said disks, restricting movement of the cylindrical members, and yieldable means for normally urging the disks into engagement with the rows of pins.

ALBERT C. PERRY.